US011338882B2

(12) United States Patent
Krause (10) Patent No.: US 11,338,882 B2
(45) Date of Patent: May 24, 2022

(54) BICYCLE HANDLE

(71) Applicant: Ergon International GmbH, Koblenz (DE)

(72) Inventor: Andreas Krause, Koblenz (DE)

(73) Assignee: Ergon International GmbH, Koblenz (DE)

( * ) Notice: Subject to any disclaimer, the term of this patent is extended or adjusted under 35 U.S.C. 154(b) by 0 days.

(21) Appl. No.: 17/228,790

(22) Filed: Apr. 13, 2021

(65) Prior Publication Data

US 2021/0316813 A1 Oct. 14, 2021

(30) Foreign Application Priority Data

Apr. 14, 2020 (DE) ..................... 20 2020 102 041.2

(51) Int. Cl.
*B62K 21/26* (2006.01)
(52) U.S. Cl.
CPC ................................... *B62K 21/26* (2013.01)
(58) Field of Classification Search
CPC ......... B62K 21/26; B62K 11/14; B62K 23/04
USPC ....................................................... 74/551.9
See application file for complete search history.

(56) References Cited

U.S. PATENT DOCUMENTS

| 8,113,087 | B2 | 2/2012 | Arnold |  |
|---|---|---|---|---|
| 8,448,299 | B1* | 5/2013 | Li | B62K 21/26 |
|  |  |  |  | 74/551.8 |
| 9,061,728 | B2 | 6/2015 | Galstad et al. |  |
| 2007/0089559 | A1* | 4/2007 | Franc | B62K 21/26 |
|  |  |  |  | 74/551.1 |
| 2010/0180400 | A1* | 7/2010 | Pell | B25G 1/10 |
|  |  |  |  | 16/110.1 |
| 2012/0048055 | A1 | 3/2012 | Krause et al. |  |
| 2012/0073400 | A1* | 3/2012 | Wang | B62K 21/26 |
|  |  |  |  | 74/551.9 |
| 2013/0104692 | A1* | 5/2013 | Segato | B62K 21/26 |
|  |  |  |  | 74/551.9 |
| 2014/0190306 | A1* | 7/2014 | Tofaute | B62K 21/26 |
|  |  |  |  | 74/551.8 |
| 2014/0260773 | A1* | 9/2014 | Arnold | B29C 45/14491 |
|  |  |  |  | 74/551.9 |
| 2017/0355417 | A1* | 12/2017 | Krause | B62K 21/14 |

FOREIGN PATENT DOCUMENTS

| DE | 202004008297 U1 | 2/2005 |  |
|---|---|---|---|
| DE | 202010011987 U1 | 1/2012 |  |
| DE | 102013204564 A1 | 9/2014 |  |
| DE | 202012013497 U1 * | 4/2017 | ............. B62K 21/26 |
| EP | 2881314 A1 * | 6/2015 | ............. B62K 21/12 |

(Continued)

OTHER PUBLICATIONS

EPO Machine Translation of TW201034901 (A), Zhang Chun-Fu, Jan. 10, 2010 (Year: 2010).*

*Primary Examiner* — Vinh Luong
(74) *Attorney, Agent, or Firm* — The Webb Law Firm (57) ABSTRACT

A bicycle handle having a sleeve connected to a wing-shaped protrusion element. The sleeve is surrounded by a handle element, the handle element includes a first material which surrounds the sleeve and the protrusion in particular completely. A second material surrounds the wing-shaped protrusion in particular completely. Thereby, a support element for the heel of the hand is formed providing high comfort.

18 Claims, 5 Drawing Sheets

(56) References Cited

FOREIGN PATENT DOCUMENTS

| EP | 3895965 A1 * | 10/2021 | ............. B62K 21/26 |
|---|---|---|---|
| JP | 2013039856 A | 2/2013 | |
| TW | 200902374 A1 | 1/2009 | |
| TW | 201034901 A1 | 10/2010 | |
| WO | 2005021366 A1 | 3/2005 | |
| WO | WO 2013026756 A1 * | 2/2013 | ............. B62K 21/26 |
| WO | WO 2021136923 A1 * | 7/2021 | ............. B62K 21/26 |

* cited by examiner

Fig. 9

US 11,338,882 B2

BICYCLE HANDLE

CROSS-REFERENCE TO RELATED APPLICATION

This application claims priority to German Patent Application No. 20 2020 102 041.2 filed Apr. 14, 2020, the disclosure of which is hereby incorporated by reference in its entirety.

BACKGROUND OF THE INVENTION

Field of the Invention

The present disclosure relates to a bicycle handle which is suited in particular for trekking bikes, mountain bikes and the like.

Description of Related Art

From WO 2005/021366 bicycle handles are known which comprise a cylindrical sleeve. The sleeve has a circular cross section, with the inner diameter corresponding to the outer diameter of the handlebar so that, for assembly, the sleeve is slipped directly onto the handlebar. The sleeve has a wing-shaped protrusion. In the mounted state the same is directed towards the user. Both the sleeve and the wing-shaped protrusion are enclosed by a handle element made from a softer material. In this manner a handle part is formed in the cylindrical portion that is also cylindrical. In the mounted state the cylindrical portion is the inner portion of the handle, i.e. the portion directed towards the handlebar stem. In the outer portion in which the wing-shaped protrusion of the sleeve is provided, a support element for the heel of the hand is formed by the handle element surrounding the wing. Thereby, the weight of the rider is supported well, especially during longer rides. Although such a bicycle handle significantly improves comfort, it may happen that the user feels the wing-shaped protrusion during prolonged loading or due to material ageing.

SUMMARY OF THE INVENTION

It is an object of the present disclosure is to improve the comfort of a bicycle handle which in particular comprises a support element for the heel of the hand.

The bicycle handle of the present disclosure which is suited in particular for trekking bikes, mountain bikes and the like, comprises a sleeve. The same preferably has a round opening, the diameter of this opening corresponding to the outer diameter of the handlebar, so that the sleeve is in direct contact with the handlebar when in the mounted state, i.e., in a state slipped onto the handlebar. The sleeve preferably has a length that substantially corresponds to the bicycle handle. If necessary, the sleeve may have a length that differs from the length of the bicycle handle by 1 cm to 2 cm.

A wing-shaped protrusion element is connected with the sleeve. The protrusion element is preferably made from the same material as the sleeve and, in a particularly preferred embodiment, it is formed integrally with the sleeve. With the bicycle handle mounted, the wing-shaped protrusion element is preferably arranged in an outer and/or central region of the sleeve. Preferably, the protrusion element extends starting from a side of the sleeve, which is the outer side in the mounted state, to at least the center of the sleeve, in particular for a length of more than 60%, in particular more than 70% of the sleeve. It is further preferred that the wing-shaped protrusion element does not extend to the region of the sleeve that is the inner region in the mounted state. Rather, it is preferred that 20% to 40% of the length of the sleeve are cylindrical in the inner region.

In the mounted state the protrusion element is directed towards the user or opposite to the traveling direction. Further, the protrusion element is preferably substantially horizontally oriented when in the mounted state. In particular, an upper side formed by the handle element is directed horizontally in the region of the protrusion element.

Independent of the design of the protrusion element, the bicycle handle of the present disclosure is designed such that the sleeve and the protrusion element are surrounded by a handle element. Thereby, a support element for the heel of the hand is formed at least by the protrusion element and the handle element arranged in the region of the protrusion element. For the improvement of comfort according to the present disclosure, the handle element comprises at least two different materials. In a particularly preferred embodiment, it is thereby possible to provide different materials in the region of the support element for the heel of the hand. These materials may be arranged in multiple layers so that, for example, in the mounted state, a plurality of layers of different materials is arranged above the wing-shaped protrusion. The comfort can be improved significantly thereby. Preferably, the at least two materials provided in the region of the wing-shaped protrusion, which form the support element for the heel of the hand, are formed from plastic material or at least substantially comprise plastic material.

In a particularly preferred embodiment, the handle element comprises a first material which covers the protrusion element at least on a side directed upward in the mounted state. Preferably, the protrusion element is enclosed by the first material so that the wing-shaped protrusion element is arranged entirely within the first material. Thereby, a good connection between this first material and the protrusion element can be realized. Specifically, a tearing-off at edges or the like is avoided. Further, in this preferred embodiment, a leading edge of the support element directed to the user in the mounted state is thus surrounded or enclosed by the first material. In particular, a result is that this edge is not felt or at least felt less by a user, specifically even during longer rides.

In a preferred development of this embodiment, the first material further also covers the sleeve at least in part. Preferably, in the mounted state, the first material also covers the sleeve at least in a region directed upwards and in the traveling direction. In a preferred embodiment, the first material thus extends in the circumferential direction from a region below the protrusion element, encloses the protrusion element and extends into a front region directed in the traveling direction. In the circumferential direction, preferably at least 150°, in particular at least 170° of the sleeve are covered by the first material, with in particular the protrusion element being enclosed in the first material. Possibly, a region of 90° to 180° of the sleeve extending in the circumferential direction is not covered by the first material. Specifically, this is a region of the sleeve that is directed downward or downward and frontward with respect to the traveling direction. The first material preferably covers the sleeve in its entirety. Thus, it is particularly preferred that the first material covers all of the protrusion element and the sleeve. Therefore, in this preferred embodiment, the protrusion element and the sleeve are in particular overmolded with the first material. Thus, the sleeve is entirely covered by the first material in particular in the circumferential direction. From this, an edge region or clamping region of the sleeve may possibly be excluded, in which, as will be described in the following, a clamping element for fixing the bicycle handle on the handlebar may be provided. Except for this clamping region, the remaining surface of the sleeve and of the protrusion element is covered by the first material in a preferred embodiment.

Preferably, the first material forms an inner material layer in the region of the protrusion element. The same preferably covers the entire protrusion element. In particular, an inner material layer is arranged on the surface which is the upper surface in the mounted state, as well as on the opposite lower surface of the protrusion element and further preferably covers an edge of the protrusion element directed towards the user.

In the region of the protrusion element, the inner material layer is preferably covered by an outer material layer. In particular, such an outer material layer is arranged on an upper side of the protrusion element, which is the side directed upward in the mounted state, or on the inner material layer. Moreover, it is preferred that the outer material layer is provided in the region of the protrusion element also on the lower side which is the side directed downward in the mounted state. It is particularly preferred that the outer material layer covers all of the inner material layer in the region of the protrusion element. So that also a front side directed toward the user is surrounded by the outer material layer. Further, it is preferred that the outer material layer is made from a different material than the inner material layer.

In a particularly preferred embodiment, the sleeve and the protrusion element are entirely enclosed or covered by an inner material layer, possible with the exception of the clamping region. In a particularly preferred embodiment, the second material layer is provided in the region of the protrusion element, the second layer covering the first material layer entirely in the region of the protrusion element. The comfort of the bicycle handle of the present disclosure can be improved significantly thereby.

In a particularly preferred embodiment, the first material is provided at least on an upper side of the protrusion element and preferably has a thickness of at least 2 mm, in particular at least 4 mm. Further, it is preferred that the thickness is less than 6 mm. Moreover, it is preferred that the first material is provided on a lower side of the protrusion element, it being preferred that the first material is provided on the upper side and the lower side. On the lower side, it is preferred as well that the material has a thickness of at least 2 mm, in particular at least 4 mm, while it is further preferred that the thickness is less than 6 mm. Furthermore, it is preferred that the first material is also provided at a front edge of the protrusion element. In this region as well, it is preferred that the first material has a thickness of 2 mm, in particular at least 4 mm, while it is further preferred that the thickness is less than 6 mm. In particular, the first material is provided on the upper side and/or the lower side and/or the front edge of the protrusion element in the above defined preferred thickness.

The second material layer is preferably provided on an upper side of the first material layer and/or a lower side of the first material layer and/or a front edge of the first material layer in the region of the protrusion element. The thickness of the second material layer is preferably greater than 2 mm, in particular greater than 4 mm, it being particularly preferred that the thickness is less than 5 mm. In the region of the front edge, it is preferred that the thickness is slightly greater than in the region of the upper side and/or the lower side of the protrusion element. In the region of the front edge, the thickness is preferably at least 5 mm, in particular 6 mm, the thickness preferably being less than 12 mm, in particular less than 10 mm.

For a further improvement of the bicycle handle of the present disclosure, the protrusion element which is in particular formed integrally with the sleeve, is preferably designed such that the protrusion element tapers, in particular continuously, starting from the sleeve. Thus, the protrusion element has a greater thickness in the region of connection with the sleeve than in a region spaced from the sleeve. In the mounted state, the thickness of the protrusion element thus tapers outward from the sleeve or in the direction of the user. Such a design of the protrusion element further has the advantage that damage to or a breaking of the protrusion element, in particular in the region of transition to the sleeve, is avoided even in the case of very high loads, such as impacts. Regardless of the design of the protrusion element, in particular of the tapering of the cross section, the in particular complete enclosing or overmolding of the protrusion element with a first material results in a reduction of the risk of damage also in the case of load peaks.

The thickness of the protrusion element is preferably 1 mm to 3 mm and, particularly preferred, 1.5 mm to 3 mm. In a preferred embodiment, the thickness of the sleeve is in a range from 1 mm to 2 mm.

If so desired, the protrusion element may be of multi-part design. In particular, individual protrusion elements may be arranged preferably side by side. In this case, for example, one protrusion element is provided in the outer region of the sleeve and a further protrusion element is provided in the central portion of the sleeve.

In a preferred embodiment, the protrusion element, which may be formed as a single part or multiple parts, does not extend in a radial direction relative to the cylindrical sleeve. Rather, it is preferred that the protrusion element or at least individual protrusion elements are arranged at an angle with respect to a radial plane. Here, the angle of a center line of at least one of the protrusion elements with respect to a radial plane of the sleeve ranges from 30° to 60°, in particular 40° to 50°. In a horizontal orientation of this radial plane, which extends in the region of the transition between the sleeve and the at least one protrusion element, the at least one protrusion element is directed downward. In particular, the protrusion element is directed downward when in the mounted state, while it is further preferred that an upper side of the support element for the heel of the hand is arranged substantially horizontally.

Should a plurality of protrusion elements be provided, it is preferred that these have the same angle and are thus arranged in one plane.

Preferably, the at least two materials from which the handle element is made differ in hardness. In this respect, it is preferred that the second material which is provided in particular only in the region of the protrusion element is softer than the first material.

It is further preferred that the sleeve is made from a material that is harder than the materials of the handle element.

In a preferred embodiment, the sleeve, as well as the protrusion element which is in particular formed integrally with the sleeve, comprises fiber-glass reinforced polypropylene and is, in particular, made from this material. If so desired, this element can be made of polypropylene without fiber-glass reinforcement. It is particularly preferred to use PP GF15. The sleeve, as well as the protrusion element preferably have a Shore A hardness which is greater than the corresponding Shore A hardness of the materials the handle element is made from.

The sleeve or the sleeve material preferably has a modulus of elasticity of 1500-3000 MPa.

The first material covers at least the protrusion element on its upper side and its lower side preferably comprises a TPE (thermoplastic elastomer) and is in particular made from the same. This material which in particular has a lower hardness than the sleeve and the protrusion element, preferably has a Shore A hardness in the range of 35 to 80 and particularly preferred in the range of 40 to 50.

The second material, which in a preferred embodiment is arranged in the region of the support element, in particular on the upper side of the support element or on the upper side of the first material enclosing the support element, is in turn designed to be somewhat softer. It is particularly preferred that the second material comprises TPE, in particular made from TPE. The Shore A hardness of this material is preferably in the range from 20 to 35, in particular 25 to 30.

For fixing the bicycle handle on the handlebar it is particularly preferred that the sleeve has a clamping region. Such a clamping region in which in particular no material of the handle element is provided, may be arranged on the outer side and/or the inner side of the sleeve. In particular, this is a region extending around the entire circumference of the sleeve. It is then possible to realize a clamping fixation of the sleeve, and thus of the bicycle handle, on the handlebar, using an in particular collar-like clamping element surrounding the sleeve in this region. To this end it is further preferred that the sleeve at least has a clamping slit in the clamping region so as to realize a reliable clamping fastening of the bicycle handle on the handlebar.

BRIEF DESCRIPTION OF THE DRAWINGS

The present disclosure will be described in more detail hereinafter with reference to preferred embodiments and to the accompanying figures.

Figure 1:
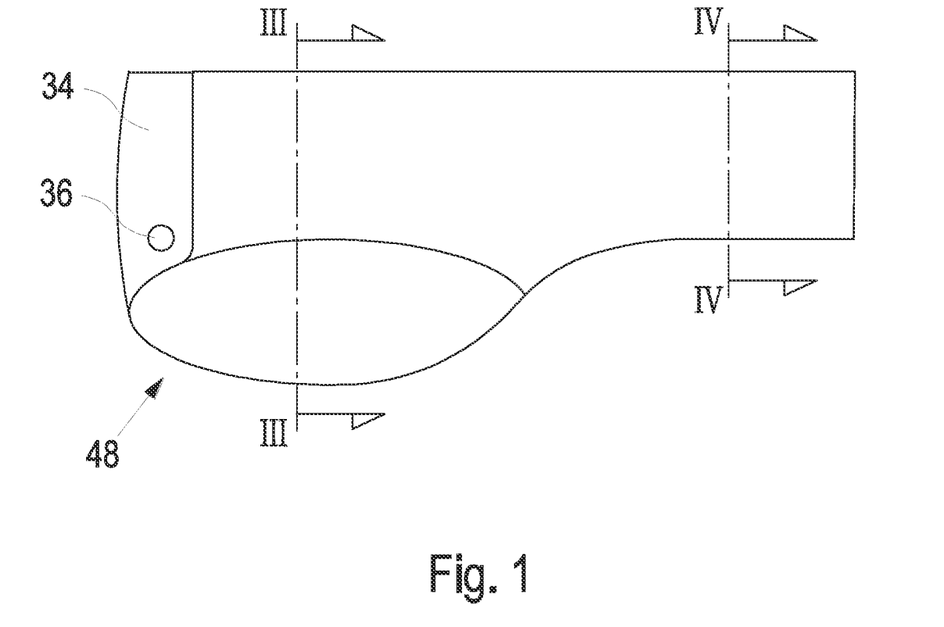
FIG. 1 is a schematic top plan view on a preferred embodiment of a bicycle handle according to the present disclosure.
Figure 2:
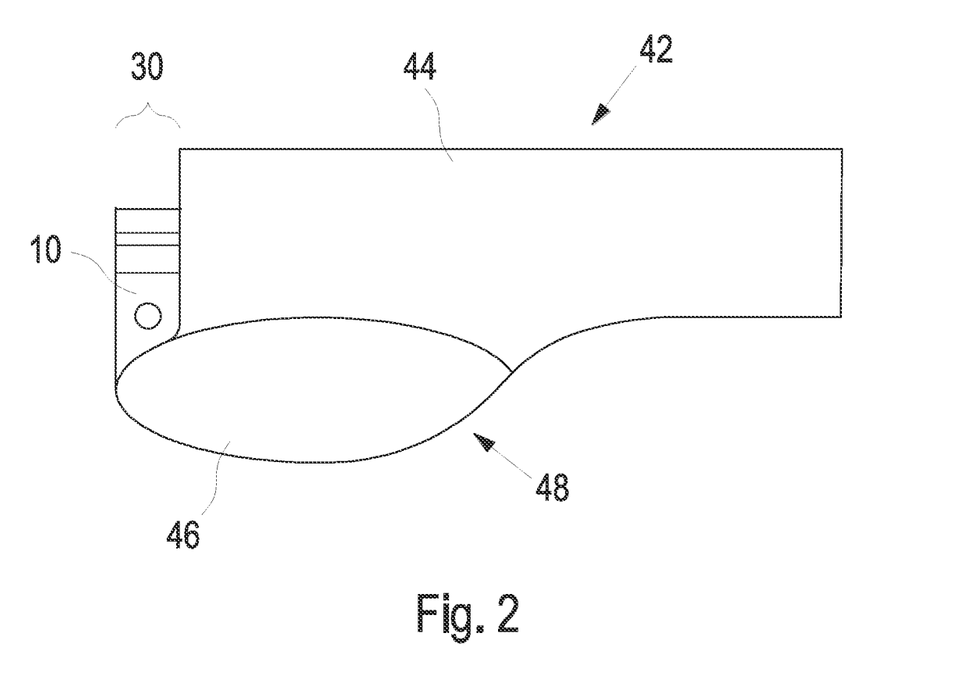
FIG. 2 is a top plan view on the bicycle handle corresponding to FIG. 1, without clamping element.

The bicycle handle of the present disclosure comprises a sleeve 10. The sleeve 10 has a cylindrical opening 12, the inner diameter of the opening 12 corresponding to an outer diameter of a handlebar. In the embodiment illustrated the sleeve 10 is integrally connected or formed with a protrusion element 14. Starting from the sleeve 10, the protrusion element in the mounted state extends in a direction 16 towards a user. In a transition region 18 between the sleeve 10 and the protrusion element 14, the thickness of the protrusion 14 is thicker than in the region 20 far from the sleeve 10 and directed to the user. The protrusion element thus tapers in particular continuously or has a conical cross section, the tapering being in the direction 16 toward the user. FIG. 1 illustrates a top plan view of a bicycle handle which is the left handle in the mounted state.

In top plan view (FIG. 5), the wing-shapes protrusion 14 has a convexly bent leading edge which again is directed 16 towards the user, when in the mounted state. Further, the protrusion element 14 extends from an outer region 24 in the direction of an inner region 26 of the sleeve 10. In the mounted state, the outer region 24 is arranged on the outer side of the handlebar and the inner region 26 is oriented towards the handlebar stem or inward, when in the mounted state. In the embodiment illustrated, the protrusion element extends over slightly more than 50% of the overall length of the sleeve 10, starting from the outer region 24 into a central portion 28.

Figure 5:
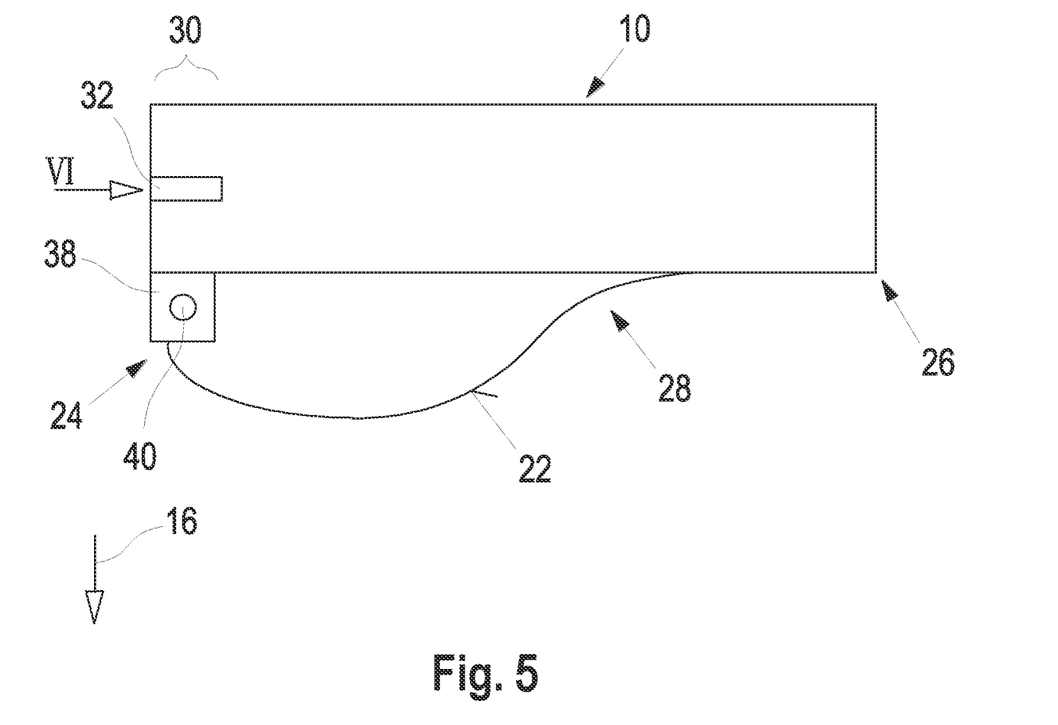
FIG. 5 is a schematic top plan view on the sleeve together with the protrusion element.
Figure 6:
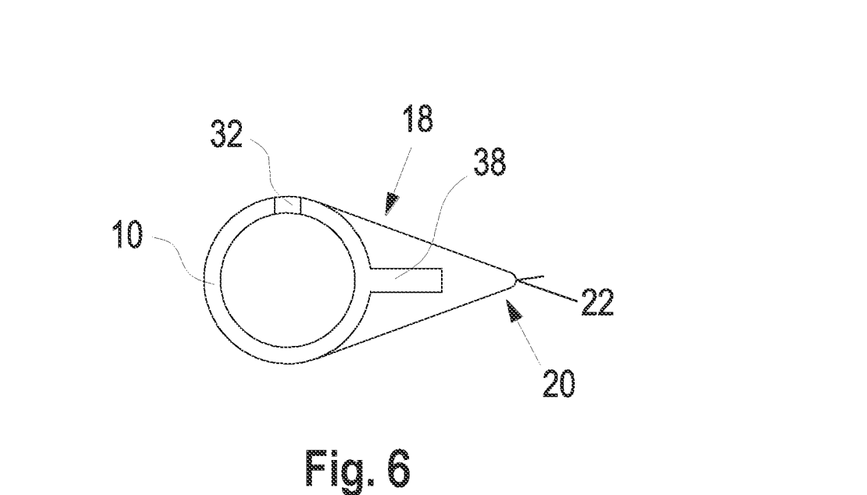
FIG. 6 is a schematic side view in the direction of the arrow VI in FIG. 5.

Furthermore, the sleeve 10 has a clamping region 30. At least one slit 32 is provided in the clamping region 30. The clamping region 30 serves to place a clamping means 34 (FIG. 1). The clamping means 34 is designed in the manner of a collar, wherein a clamping means for tightening the collar-like clamping element 34 is arranged in a threaded opening 36. The clamping means is passed through an opening 40 provided in a protrusion 38 (FIG. 5). However, such a protrusion may be omitted. If the protrusion 38 is not provided, it is preferred that the wing-shaped protrusion 14 is connected with the sleeve 10 not before a region that is arranged inside the clamping region 30 and preferably adjoins the same directly.

Figure 3:
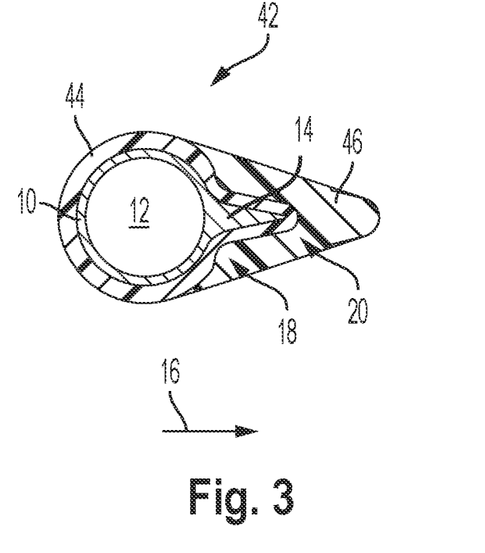
FIG. 3 is a schematic sectional view along line III-III.

In the embodiment illustrated, the sleeve 10, as well as the protrusion 14 are entirely enclosed by a handle element 42 with the exception of the clamping region. In the embodiment illustrated, the handle element 42 is formed from two different materials 44, 46. The first material 44 is arranged directly on the upper surface of the sleeve 10, as well as of the protrusion 14 and, except for the clamping region 30, completely encloses both the sleeve 10 and the protrusion element 14. In the region of the protrusion element 14, the first material 44 is designed to be slightly thinner so that the protrusion element 14 is covered by a second material layer formed by the second material 46. The latter again extends entirely around the protrusion 14 or the first material surrounding the protrusion 14 (FIG. 3).

Since the material 46 is preferably softer than the material 44, it is possible to thereby form a comfortably soft support element 48 for the heel of the hand in the region of the wing-shaped protrusion element 14. Further, due to the design of the protrusion element 14 which in particular tapers in cross section, and due to the provision of two material layers 44, 46 in the region of the protrusion element 14, a good stability is ensured even if great forces occur.

Figure 4:
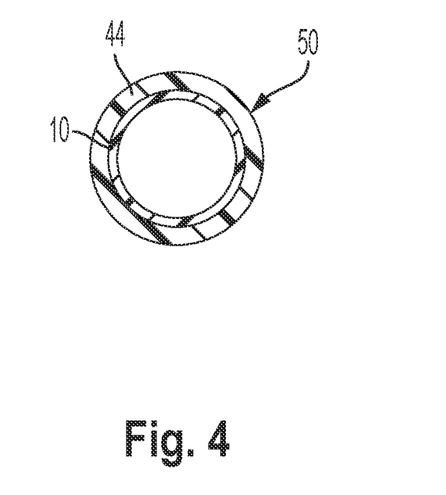
FIG. 4 is a schematic sectional view along line IV-IV in FIG. 1.

The second material 46 is provided only in the region of the wing-shaped protrusion 14. In a region which in the mounted state is directed towards the handlebar stem or inward, the bicycle handlebar has a substantially circular cylindrical upper side 50 (FIG. 4).

Instead of the clamping element 34 illustrated in FIG. 1, a clamping element designed as a holding horn can also be provided.

In a further preferred embodiment (FIGS. 7 and 8) all similar and identical components are identified by the same reference numerals.

Figure 7:
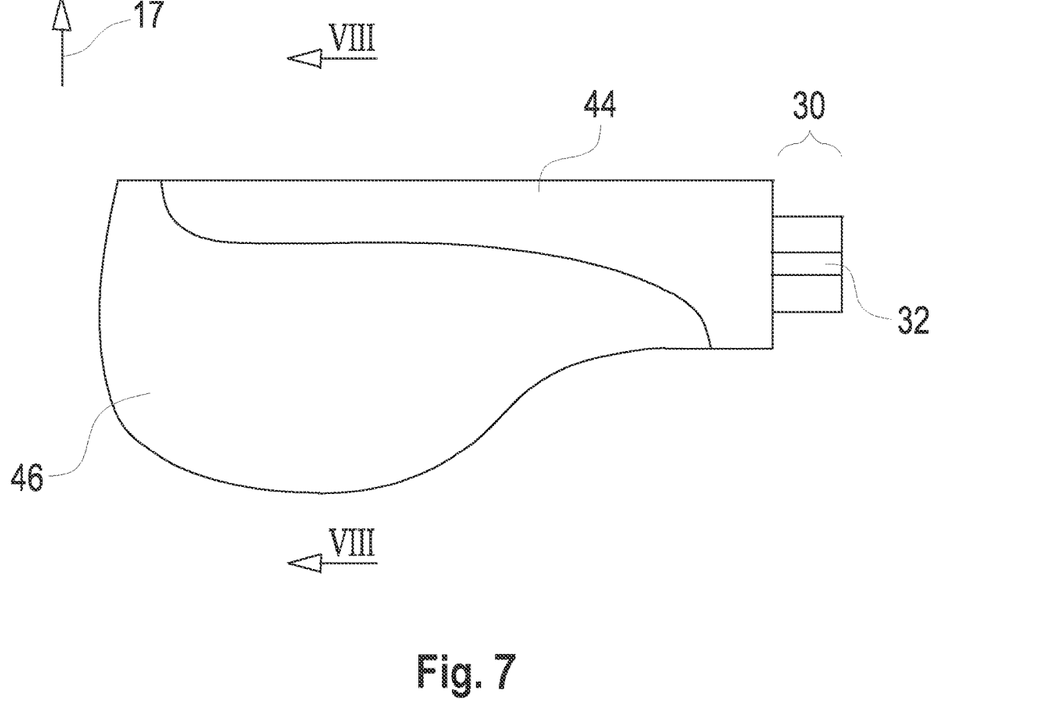
FIG. 7 is a schematic top plan view on a further preferred embodiment of a bicycle handle according to the present disclosure.
Figure 8:
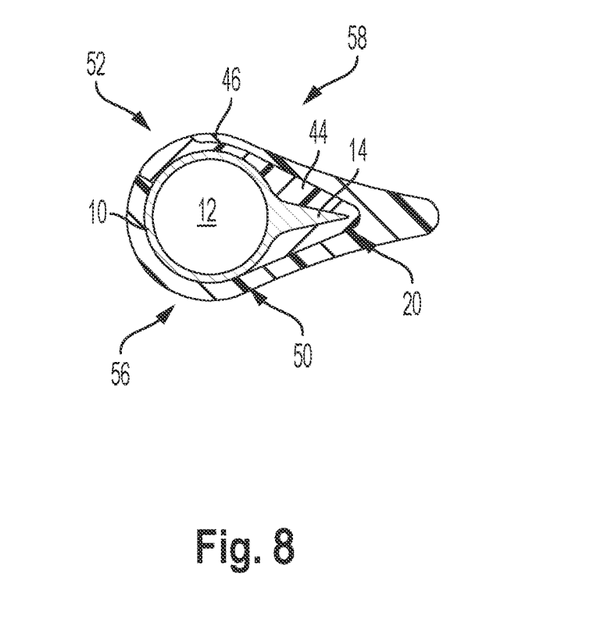
FIG. 8 is a schematic sectional view along line VIII-VIII in FIG. 7.

It is an essential difference between the two embodiments illustrated that the clamping region 30 in the embodiment illustrated in FIGS. 7 and 8 is arranged on the inner side and not on the outer side of the bicycle handle in the mounted state. Clamping elements could be provided both in the inner region and in the outer region.

Further, the design of the layers of the two materials 44 and 46 is slightly different. The second material 44 still encloses the protrusion element 14 which is formed with the sleeve 10, in particular integrally. However, the first material 44 does not surround the sleeve 10 completely. Rather, the sleeve 10 is surrounded by this material only in an upper region, the material 44 extending continuously up to an upper side 52, starting from a lower side 50. The upper side 52 is directed in the traveling direction 17.

Analogous to the first embodiment, the second material 46 encloses the region of the support element 48. In addition, the material 56 encloses the sleeve on a lower side. Specifically, the material 56 encloses the region of the sleeve 10 in which the material 44 is not provided. Further, in an upper region 58, in which the heel of the hand and at least a part of the palm of the user rest and in which great forces occur, the softer material 46 is provided.

FIG. 8 illustrates an alternative embodiment wherein similar and identical components are identified by the same reference numerals. The inner sleeve 10 is also connected with a protrusion element 14 or is integrally formed. However, other than in the embodiment illustrated in FIG. 8, the protrusion element 14 is not arranged in a radial direction with respect to the cylindrical sleeve 12, but is arranged at an angle. Here, an upper side of the protrusion element 14 is arranged at an angle α with respect to a radial plane 60. In a referred embodiment, the angle α ranges from 30° to 60°, in particular 40° to 50°.

The protrusion element 14 is surrounded by the first material 44. On an upper side 62 of the protrusion element 14, the first material 44 has a thickness of in particular at least 2 mm, in particular at least 4 mm, the thickness being <6 mm in particular. Also in the region of the front edge 20, the thickness in the embodiment illustrated is greater than 2 mm, in particular greater than 4 mm. In the embodiment illustrated this is also true for the region of the first material 44 on a lower side 64 of the protrusion element 14.

In the embodiment illustrated, the second material 46 covers the protrusion element 14, as well as the first material 44 in the region of the support element for the heel of the hand 48. On an upper side 66 of the first material 44, on a lower side 68 of the material 44 and also in the region of the front edge 20 of the material 44, the second material 46 has a thickness of preferably more than 2 mm, in particular more than 4 mm.

In the embodiment illustrated a further material 70 is provided opposite the protrusion element 14 or the support element 48 for the heel of the hand. The same extends completely or partly over the length of the bicycle handle. The material 70 may be a third material component and, in a preferred embodiment, may be the first material.

Figure 9:
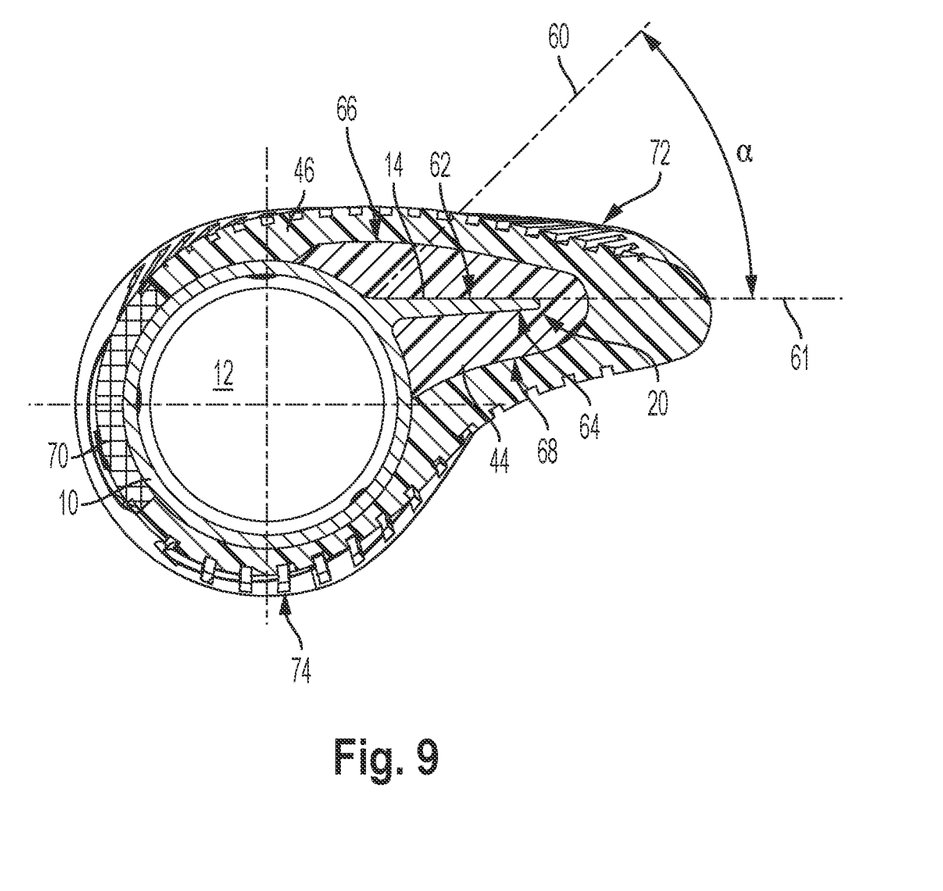
FIG. 9 is a sectional view according to FIG. 8, showing an alternative embodiment of the present disclosure.

Further, it can be seen from the embodiment illustrated in FIG. 9 that an upper side 72, as well as a lower side 74 of the second material 46 each comprise grooves running parallel to each other, so that a surface texture is created. The surface texture may also be designed differently. In particular, differently designed recesses and/or raised parts may be provided to form a texture on the upper side 72 and/or the lower side 74.

It is essential that in both embodiments two material layers are provided in the region of the protrusion element 14.

The invention claimed is:

1. A bicycle handle comprising:
   a sleeve;
   a wing-shaped protrusion element connected with the sleeve;
   a handle element surrounding the sleeve and the protrusion element; and
   a support element for the heel of the hand formed at least by the protrusion element and the handle element arranged in the region of the protrusion element;
   wherein the handle element comprises at least two different materials, wherein the handle element is tri-layered in the region of the protrusion element to form the support element for the heel of the hand,
   wherein a first layer of the tri-layered handle element is the protrusion element, a second layer of the tri-layered handle element is an inner material completely covering the protrusion element, and a third layer of the tri-layered handle element is an outer material completely covering the inner material in the area of the support element,
   wherein the inner material is different from the outer material.

2. The bicycle handle of claim 1, wherein the at least two different materials comprise a plastic material.

3. The bicycle handle of claim 1, wherein at least a portion of the inner material has a thickness of at least 2 mm.

4. The bicycle handle of claim 3, wherein at least a portion of the inner material has a thickness of at least 4 mm.

5. The bicycle handle of claim 1, wherein at least a portion of the outer material has a thickness of at least 2 mm.

6. The bicycle handle of claim 5, wherein at least a portion of the outer material has a thickness of at least 4 mm.

7. The bicycle handle of claim 1, wherein the protrusion element tapers starting from the sleeve.

8. The bicycle of claim 7, wherein the protrusion element has a thickness of 1 mm to 3 mm or the sleeve has a thickness of 0.8 mm to 3 mm.

9. The bicycle handle of claim 8, wherein the protrusion element has a thickness of 1.5 mm to 3 mm.

10. The bicycle handle of claim 1, wherein the protrusion element is of a multi-part design.

11. The bicycle handle of claim 1, wherein a center line, an upper side of the protrusion element, or at least one of the parts of the protrusion element is arranged at an angle from 30° to 60° with respect to a radial plane of the sleeve.

12. The bicycle handle of claim 1, wherein the at least two materials differ in hardness.

13. The bicycle handle of claim 1, wherein the sleeve is made of a material that is harder than the materials of the handle element or that the sleeve comprises polypropylene (PP).

14. The bicycle handle of claim 1, wherein the sleeve or the sleeve material has an I-module of 1500 to 3000 MPa.

15. The bicycle handle of claim 1, wherein at least one of the inner material or the outer material comprises TPE (thermoplastic elastomer).

16. The bicycle handle of claim 1, wherein the inner material has a hardness of 35 Shore A to 80 Shore A or the outer material has a hardness of 20 Shore A to 35 Shore A.

17. The bicycle handle of claim 1, wherein the sleeve comprises a clamping region at which a clamping element is arranged.

18. The bicycle handle of claim 17, wherein the sleeve comprises at least one clamping slit in the clamping region.

* * * * *

UNITED STATES PATENT AND TRADEMARK OFFICE
CERTIFICATE OF CORRECTION

| | |
|---|---|
| PATENT NO. | : 11,338,882 B2 |
| APPLICATION NO. | : 17/228790 |
| DATED | : May 24, 2022 |
| INVENTOR(S) | : Andreas Krause |

It is certified that error appears in the above-identified patent and that said Letters Patent is hereby corrected as shown below:

In the Claims

Column 8, Line 35, Claim 8, after "bicycle" insert -- handle --

Column 8, Line 54, Claim 15, after "wherein" delete "at least"

Column 8, Line 61, Claim 17, delete "which-a" and insert -- which a --

Signed and Sealed this
Nineteenth Day of July, 2022

Katherine Kelly Vidal
*Director of the United States Patent and Trademark Office*